Figure 1:
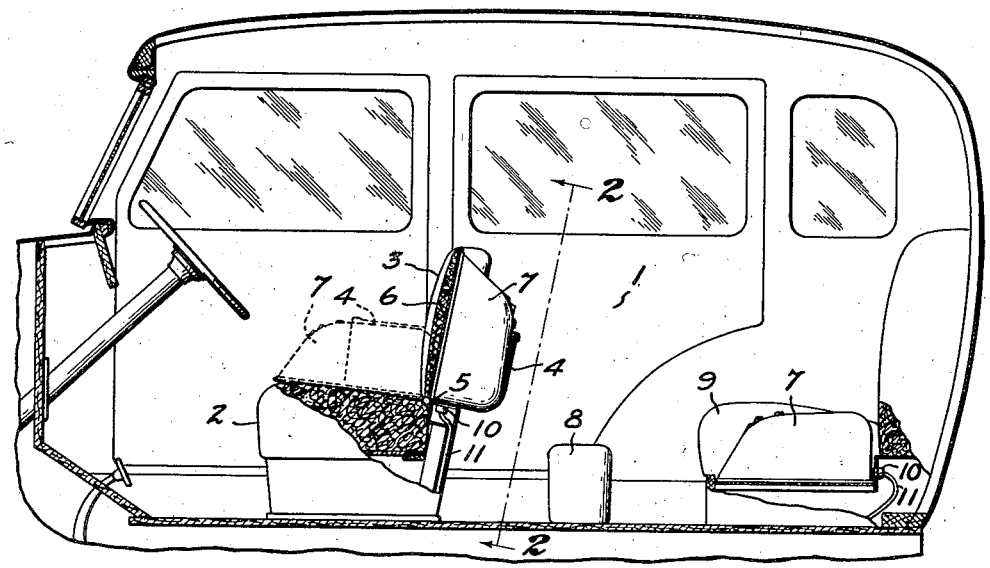

Feb. 23, 1937.   W. A. FRANTZ ET AL   2,071,398
RADIO RECEIVER
Filed July 11, 1933   2 Sheets-Sheet 1

INVENTORS
Walter A. Frantz
BY Paul D. Kendall
Their ATTORNEY

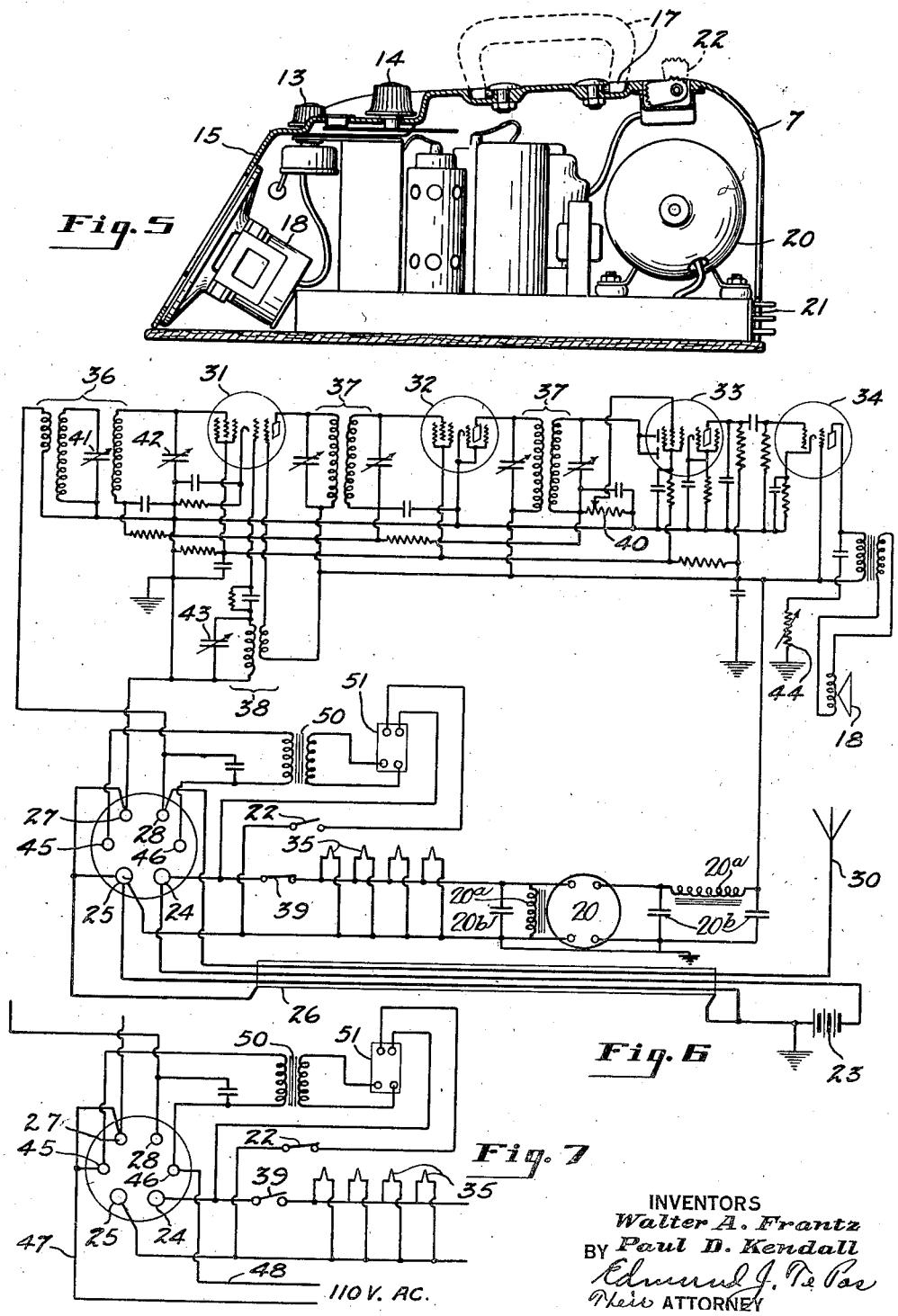

Patented Feb. 23, 1937

2,071,398

UNITED STATES PATENT OFFICE 2,071,398

RADIO RECEIVER

Walter A. Frantz and Paul D. Kendall, Cleveland Heights, Ohio; said Kendall assignor to said Frantz Application July 11, 1933, Serial No. 679,856

5 Claims. (Cl. 250—14)

This invention relates to radio receivers and in particular a portable radio receiver which is adapted for operation on different types of current supply as for example a six volt storage battery or a 110 volt alternating current lighting circuit.

One of the objects of this invention is the provision of a portable radio receiver which may be readily installed for use in an automobile or removed for use elsewhere.

Another object of this invention is the provision of a portable automobile radio receiver wherein the controls and other essential elements of the set are contained within a single unitary apparatus.

Another object of this invention is the provision of an improved automobile radio receiver in which the loud speaker of the receiver is arranged so that the occupants of the automobile in which the set is used can obtain better reception of the sound reproduced by the receiver.

Another object of this invention is the provision of an automobile radio receiver in which the receiver is located so that there is apt to be little interference in the operation of the receiver due to the operation of the automobile motor.

Another object of this invention is the provision of an automobile radio receiver which is arranged and located so as to minimize the danger of injury to the receiver by the vibration of the automobile or its engine.

Another object of this invention is the provision of an automobile radio receiver which can be readily and easily serviced and repaired.

Another object of this invention is the provision of a radio receiver in which the cabinet of the receiver can be used to provide a comfortable arm rest for the occupants of the car adjacent to the receiver.

Another object of this invention is the provision of an automobile radio receiver in which the controls of the receiver are arranged so that the driver of the car can manipulate the same without taking his eyes off the road while driving the car.

Another object of this invention is the provision of an automobile radio receiver in which the controls are arranged so as to readily permit accurate and close tuning of the receiver.

Another object of this invention relates to the provision of a radio receiver which is adapted for operation on sources of electrical current supply of different voltages.

Another object of this invention relates to the provision of a unitary automobile receiver which can be completely constructed, assembled and tested at the place where it is manufactured.

Another object of this invention relates to the provision of a radio receiver whereby easy access may be had to the tubes and other elements of the set.

A further object of this invention relates to the provision of an improved automobile radio receiver which can be readily operated by the occupants either of the front or rear seats of an automobile.

With these and other objects in view, the invention consists in the novel construction, arrangement and combination of parts, hereinafter illustrated and described in some of its embodiments in the accompanying drawings, and particularly pointed out in the appended claims.

Figure 3:
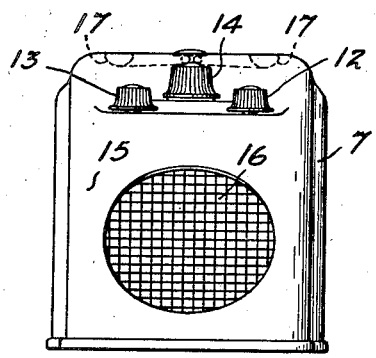
Figure 2:
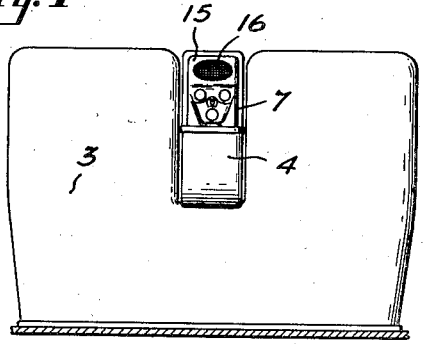
Figure 4:
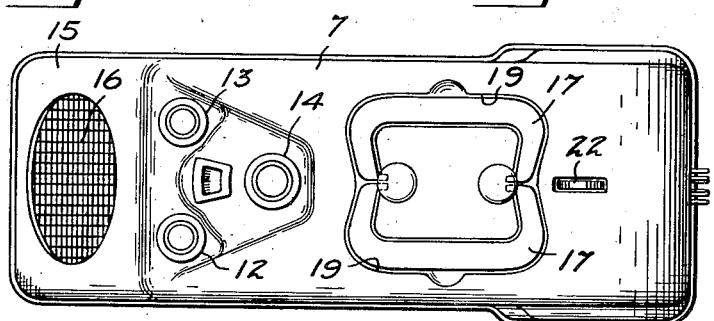

In the drawings, Figure 1 is a side elevational view of the body of an automobile with certain of the parts broken away, illustrating two different arrangements for the utilization of this invention; Figure 2 is a sectional view taken on line 2—2, Figure 1 showing the rear of the front seat of the automobile with the radio receiver in position for operation by the occupants of the rear seat of the car; Figure 3 is an enlarged end elevational view of the front end of the radio receiver; Figure 4 is a plan view of the radio receiver shown in Figure 3; Figure 5 is a side elevational view of the radio receiver shown in Figures 3 and 4 with a portion of the receiver case broken away to illustrate the arrangement of the working parts of the receiver; Figure 6 is a wiring diagram of the circuit of the receiver illustrated herein, showing connections and circuit used when the receiver is operated by a storage battery; and Figure 7 is a detail view of part of the circuit shown in Figure 6 illustrating the connections and circuit used when the receiver is operated by a 110 volt source of alternating current.

In Figure 1 of the drawings there is illustrated two different ways of using this radio receiver in a passenger automobile 1, having a front seat 2 provided with a sectional back rest 3 for the occupants of the front seat of the car. In the space between the sections of the back rest 3 of the front seat 2 an open box-like structure 4 is secured at its lower front end to the seat frame by a hinge 5. One side of the box is upholstered as at 6 so that when the box is upright as shown in the full line position in Figure 1, the upholstered side 6 of the box forms a substantially smooth continuation of the upholstered part of the back rest of the front seat.

The box 4 is provided for removably receiving a radio receiver of the type illustrated herein, the case or cabinet of which is indicated by the numeral 7. The pivoted holding means provided for the box 4 permits the set to be located with respect to the front seat of the car, in either a substantially vertical position as shown in full lines in Figure 1 or in a substantially horizontal position as shown in dotted lines in Figure 1.

For the purpose of illustrating another manner of practicing this invention, the rear seat 9 of the car is provided with a sectional seat having a cushion 8 which can be removed from the center of the seat and used as a foot rest. The space vacated by the cushion can then be utilized for the reception of the radio receiver as illustrated in Figure 1 of the drawings. At the rear end of the receiver there is provided a plug part for reception of a complementary plug part 10 which is provided with terminals connected to the conductors of a cable 11 which provides the necessary electrical connections for the operation of the receiver.

Control knobs for the operation of the receiver are provided at the forward end of the cabinet 7. The knob 12 is for the tone control; the knob 13 is for the volume control; and the knob 14 is for the station control. The knob 13 also actuates a switch for connecting the receiver to a source of electrical current supply. The front end 15 of the receiver case is tilted back from the vertical and is provided with a screen 16 immediately behind which there is positioned the loud speaker of the receiver. The cabinet 7 is provided with a pair of carrying handles 17 which when not in use can be folded down into recesses 19 so as to be flush with the top face of the cabinet.

Referring now to the chassis shown in Figure 5, the loud speaker 18 of the receiver is located at the forward end of the chassis and when the receiver is in the horizontal or dotted line position on the front seat as shown in Figure 1, the sound waves from the loud speaker are directed against the windshield of the car and then reflected back to the occupants of the car. This permits the receiver to be operated at a low setting of the volume control while at the same time providing for good and clear reception of radio broadcasts.

To the rear of the chassis there is provided a motor-generator 20 for converting the six volt direct current of the automobile battery to the high voltage alternating current necessary for the operation of the receiver. Filter means comprising choke coils 20ª and condensers 20ᵇ are connected in the motor-generator circuit as shown. At the lower rear end of the receiver a plug part 21 is provided for reception of the complementary plug part 10 for connecting the receiver to aerial and ground connections and to a source of current supply. A small manually operable switch 22 is provided on the top of the cabinet 7 for cutting out, when the receiver is operated on a battery, that portion of the electrical circuit which is used when the receiver is connected for one hundred and ten volt alternating current operation.

Figure 6 illustrates the circuit used when the receiver is connected for operation by the storage battery of an automobile. By means of the plug part 10 and a suitable cable 11 the storage battery 23 of the car is connected at its positive side to one of the terminal members 24 of the plug part 21. The negative or grounded side of the battery is connected to the plug terminal 25. A shield or electrically conducting flexible sheath 26 forms the exterior of the cable 11. One end of the shield 26 is connected to the terminal 25 and the other end of the shield is connected to the grounded side of the battery. The receiver circuit is grounded through the plug terminal member 27 and the shield 26. The plug terminal member 28 is provided for connecting the receiver circuit to the car aerial 29 by means of one of the conductors provided by the cable enclosed in the shield 26.

Four tubes are used in the circuit of this set, including a first detector and oscillator tube 31, an intermediate frequency amplifier tube 32, a second detector, first audio frequency and automatic volume control tube 33 and a second audio frequency amplifier tube 34. The heating filaments of these tubes are indicated at 35. The numeral 36 indicates a combined antenna pre-selector and detector coil. Intermediate coupling transformers are indicated at 37 and an oscillator coil is indicated at 38. A control switch 39 and volume control 40 are operated by the knob 13. Condensers 41, 42, and 43 are ganged together for operation by the tuning control knob 14 and the tone control 44 is under control of the knob 12.

When it is intended to operate the set by means of a one hundred and ten alternating current supply, an extension cord (not shown) having on one end a plug part complementary to the plug part 21 and having at its other end suitable terminals for connecting to such supply circuit is used. When this connection is used the terminals 45 and 46 are connected to the one hundred and ten volt circuit by way of the conductors 47 and 48. The conductor 47 of this circuit provides an aerial for the receiver and the other conductor strand 48 provides the ground connection.

The one hundred and ten volt alternating current supply is connected to a transformer 50 where the voltage of the current is reduced to about nine and one-half volts. The transformer is in turn connected to a rectifier 51, where the alternating current is changed to direct current at a potential of about six volts. The rectifier is connected in the storage battery circuit and the six volt direct current supply from the rectifier can then be used in place of the current formerly supplied by the battery 23.

In its preferred form all of the elements of the receiver are contained within the case 7. Where it is intended or desired to operate the set exclusively on six volt D. C. current the transformer 50 and the rectifier 51 can be omitted. By reason of the provision of a receiver that can be carried on the seat of an automobile the cushions of the seat can be utilized to provide floating support for the receiver and a further advantage results in that there is no need for the use of remote controls customarily employed in connection with automobile radio receivers. The two arrangements shown for the mounting of the receiver could be used equally well with either the front or the rear seat of the car.

The special provisions in the upholstery of the car may be dispensed with entirely and the receiver can be placed directly on the cushions of either the front or rear seat whereupon it can be connected to the plug part 10 for operation. The switch 22 is moved to open position when the receiver is placed in its box 4. This switch is provided to prevent the rectifier from being connected in the storage battery circuit when the receiver is operated by the battery.

If desired, receiver circuits other than the superheterodyne circuit disclosed herein may be employed, and other electrical devices may be substitute for the motor-generator, the rectifier and some of the other electrical apparatus shown for accomplishing the same objects as will readily occur to one skilled in the radio art.

Furthermore it is to be understood that the particular forms of apparatus shown and described, and the particular procedure set forth are presented for purposes of explanation and that various modifications of said apparatus and procedure can be made without departure from this invention as described in the appended claims.

We claim:

1. Radio receiving apparatus for use in an automobile having seats arranged one behind the other comprising, a radio receiver having a case adapted to fit in a space on the front seat between the occupants thereof, means attached to such seat for supporting said receiver in either of two positions, and control means for said receiver at the forward end of the receiver case readily accessible to the occupants of the front seat on either side of said receiver for one position of said receiver, said control means being in position for manipulation by the occupants of the rear seat of the car for the other position of said receiver.

2. Radio receiving apparatus for use on the seat of an automobile comprising, a radio receiver having a narrow elongated case adapted to be supported by the seat between the occupants thereof, the length of the receiver case being considerably greater than either the height or width thereof, the front end of said case being tilted rearwardly and downwardly and having a screened aperture behind which the loud speaker of the receiver is positioned with the axis of its diaphragm substantially perpendicular to the plane defined by the screened opening, and control means for said receiver at the forward end thereof in a position readily accessible to the occupants of the seat on either side of said receiver.

3. Radio receiving apparatus for use in an automobile comprising the combination with a seat of the automobile of a removable section in the center thereof, a radio receiver having a case adapted to fit into the space in the seat provided upon the removal of said removable section, the top of said case being substantially flush with the level of the seat, and control means for said receiver readily accessible to the occupants of the seat on either side of said receiver.

4. Radio receiving apparatus for use in an automobile having seats arranged one behind the other comprising, a relatively small portable radio receiver having a case for housing all of the operating parts of the receiver, means attached to the front seat of the automobile for supporting said receiver in either of two positions in one of which the receiver rests upon the front seat of the automobile, the back of the front seat of the automobile having a recess for receiving the said receiver in the other of its two limiting positions, and control means for said receiver at the forward end of the receiver case readily accessible to the occupants of the front seat on either side of said receiver for the first position of said receiver, said control means also being in position for manipulation by the occupants of the rear seat of the car for the other position of said receiver.

5. Radio receiving apparatus for use in an automobile having seats arranged one behind the other comprising, a relatively small portable radio receiver having a case for housing all of the operating parts of the receiver, means attached to the front seat of the automobile for supporting said receiver in either of two positions, said means having an upholstered surface forming a part of the back rest of the front seat of the automobile for one of the limiting positions of said receiver, and control means for said receiver at the forward end of the receiver case readily accessible to the occupants of the front seat on either side of said receiver for one position of said receiver, said control means also being in position for manipulation by the occupants of the rear seat of the car for the other position of said receiver.

WALTER A. FRANTZ.
PAUL D. KENDALL.